Feb. 9, 1943.                S. G. ESKIN                2,310,519
                          REGULATING DEVICE
                         Filed Feb. 1, 1940

INVENTOR
Samuel G. Eskin

Patented Feb. 9, 1943

2,310,519

UNITED STATES PATENT OFFICE 2,310,519

REGULATING DEVICE

Samuel G. Eskin, Mount Lebanon, Pa., assignor to Robertshaw Thermostat Company, Youngwood, Pa., a corporation of Pennsylvania Application February 1, 1940, Serial No. 316,859

3 Claims. (Cl. 297—3)

The present invention relates to regulating devices and more particularly to a new and improved element which is responsive to the pressures or temperatures to be controlled and which will actuate a valve, a switch or the like, for controlling the pressures or for regulating supply of fuel or other heating medium employed. When the device which I provide is applied to gas stoves or other gas appliances, it will serve to regulate the supply of gas, and where it is applied to an electric stove or other electric device, it controls the supply of electricity to the heating elements employed. Where it is used for regulating pressures it will serve to operate a valve or a switch for controlling the pressure either directly or indirectly.

As is well-known, heretofore various types of thermostatic devices have been employed for regulating the temperature prevailing in a chamber such as a room or an oven or other heating compartment. One type which has been used extensively is known as the "rod and tube" type. In this type of device a relatively non-expansible rod is surrounded by a tube formed of a different and more highly expansible metal, and this difference in the expansibility of the two metals when subjected to heat is utilized for actuating a switch or a valve. Thermostatic devices embodying bi-metallic strips having different coefficients of expansion have also been used. When the strips are heated or cooled they bend due to the difference in the coefficients of expansion thereof and this movement is utilized to actuate the valve or switch. One of the chief difficulties with devices of this character is that they are not sufficiently flexible to permit their installation at various desirable positions on the stoves or other devices to which they are attached. Furthermore, devices of this general character have required an undesirable amount of cutting of the oven walls of a stove in order to satisfactorily position them so that they will be reasonably accessible to the operator.

As a result of these objectionable features of the old rod-and-tube and bimetallic types of instruments, devices embodying hydraulic thermal elements have recently come into favor in the gas and electric appliance field. Generally speaking, in devices of this character, that is, in devices wherein a hydraulic element is employed for actuating the switch or valve, an expansible liquid is employed for operating the valve or switch. The expansible liquid is contained in a bulb and a bellows and the connecting tube. The bulb is placed in the oven or other compartment, the temperature of which is to be controlled, and the bellows and the other operating parts may be suitably positioned wherever desired on the range or appliance. When the temperature in the oven or other compartment is raised to the desired point, the liquid in the bulb expands and operates the valve or switch, and thereby cuts off or reduces the flow of fuel or electricity to the heating elements. As the temperature in the oven or compartment is lowered, the liquid in the bulb contracts and the valve or switch is again actuated so as to increase the supply of fuel or current to the heating elements. The movement of the bellows in such devices is transmitted to the valve or switch by suitable mechanism, and the device is arranged so that adjustment of the operating parts can be effected by an adjusting dial or handle so as to open and close the valve or switch at any desired temperature.

Thermostatic regulators of this bellows or diaphragm type are subject to several objections. The bulb thereof has to be relatively large in order to provide sufficient movement of the bellows or diaphragm to give the requisite movement of the plunger or operating stem connected therewith. In such devices where an expansible diaphragm type of operating unit is employed, the bulb is normally about $9\frac{1}{8}''$ in length and has a volume of approximately .1300 cubic inch. Such a large bulb has been found necessary where chlorinated diphenyl is used as the thermoresponsive liquid. Where other liquids are used, for example, mercury, a considerably larger bulb is required in order to obtain the desired movement of the bellows or diaphragm. The use of a large bulb, and hence the use of a large amount of liquid, is especially objectionable in certain types of devices where the space in which the bulb has to be placed is small. The size of the bulb does not render devices of this character particularly objectionable in gas ranges where the oven is relatively large, but in certain types of appliances the size of the bulb is of considerable importance. In fact, the size of the bulb which has been heretofore required in devices of this character has prevented the use thereof on certain types of appliances.

By the present invention I have overcome this objectionable feature of this type of thermostatic regulator and provide one in which the bulb can be made many times smaller than the bulbs which have been heretofore used in such regulators.

In view of the fact that it has heretofore been necessary to employ a bulb which is relatively large, a substantial quantity of liquid has been required in order to fill the bulb, the capillary tube and the diaphragm or bellows. This feature is quite objectionable as the liquids capable of being used in devices of this character are relatively expensive and it is desirable to utilize as little as possible thereof. I have found that in the device which I provide I can utilize a bulb approximately ¼ the size of the bulb normally used in the ordinary metal bellows type of thermal element and that I can use a bulb approximately ⅙ as large as the bulb required for the ordinary metal diaphragm type of thermal element to obtain the same deflection for one degree change of temperature. This reduction in the size of the bulb and the quantity of liquid required effects a material savings in the manufacturing cost.

The present invention is particularly applicable to thermostatic regulators of the character just discussed although, as will become apparent as the description thereof proceeds, it can be applied to various other types of devices in which it is desirable to open or close a valve, a switch, or the like upon an increase or decrease of temperature or pressure. In the ensuing description my invention will be described as applied to thermostatic regulators of the character mentioned above.

In the accompanying drawing I have shown a preferred embodiment of my invention and one modified form thereof. In the drawing.

Figure 1:
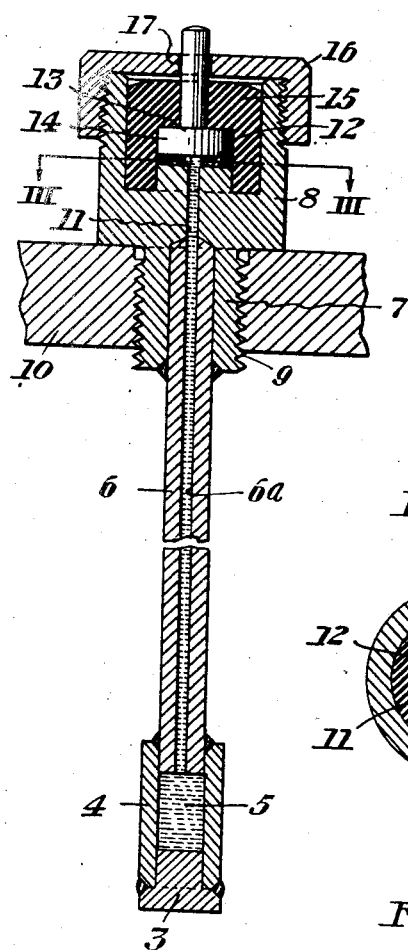
Figure 1 is a central section through the regulator which I provide showing the parts in one operating position.
Figure 2:
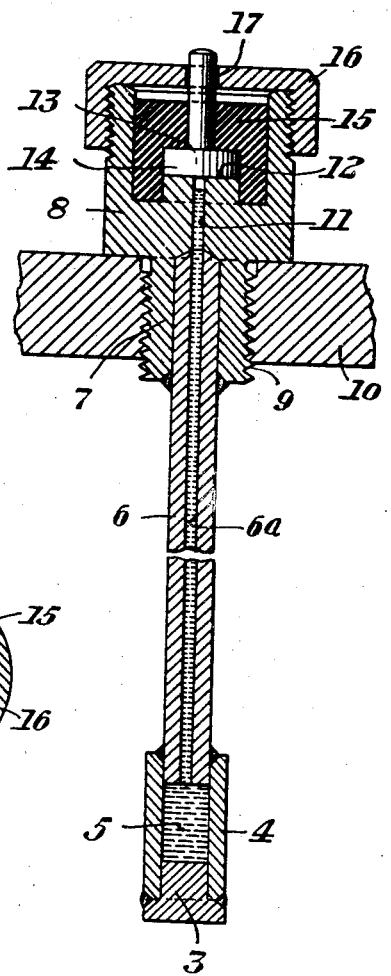
Figure 2 is a view similar to Figure 1 showing the parts in a different position.
Figure 3:
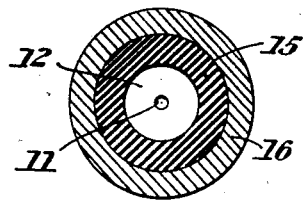
Figure 3 is a section taken along the line III—III of Figure 1.

In the device shown in Figures 1 to 3 of the drawing the bulb 4 is adapted to be positioned in the oven or other chamber, the temperature of which is to be controlled. This bulb is closed at one end by a plug 3 which is secured thereto by welding or by some other suitable method of securing it in position in the end of the bulb. The bulb is hollow and is adapted to contain an expansible fluid 5. The other end of the bulb is secured to a tube 6 having a passageway 6a. This passageway 6a is likewise filled with the expansible fluid 5. This tube may be of any suitable length to permit the bulb to be positioned at any desired location in the device and at a suitable distance away from the balance of the device.

The other end of the tube 6 extends into a stud 7 formed at one end of the casing 8. This stud is externally threaded at 9 so as to permit it to be screwed into an appropriate supporting wall or plate 10. The tube and stud are secured together by welding or some other suitable method so that the tube will not move relative to the stud.

The casing 8 is provided with a small passageway 11, one end of which is in direct communication with the passageway 6a through the tube. The other end of the passageway 11 which is formed in the casing 8 opens into the interior of the casing. As shown in the drawing, it opens into the interior of the casing through the face 12 of a raised portion or boss formed in the interior of the casing.

A plunger 13 is positioned in the interior portion of the casing 8 and the head 14 thereof cooperates with and is normally in engagement with the face 12. The interior or cup-like portion of the casing 8 is filled with a flexible or resilient material 15. When the plunger is in the position shown in Figure 2, the flexible or resilient material surrounds the raised portion of the casing with which the plunger cooperates, the head of the plunger and a portion of the stem thereof, one end of the stem of the plunger extending beyond the upper surface of the body of flexible material.

This body of flexible or resilient material is molded into intimate contact with the interior of the casing and the plunger so that it will be firmly held in contact with the plunger and the casing when the liquid in the bulb and tube expands and moves the plunger. Since the material is flexible or resilient, expansion of the liquid in the bulb and tube will move the plunger away from the face 12 and this movement will be transmitted to the valve or switch or other operating mechanism. In view of the fact that the flexible or resilient material is molded firmly and substantially permanently to the interior of the casing and to the plunger, the liquid which enters the casing upon the expansion of the liquid in the bulb and tube will not be permitted to escape from between the head of the plunger and the cooperating face of the boss portion of the casing.

Although it is not essential, a cap 16 is preferably provided for the casing. The outer wall of the casing is threaded at its upper end to cooperate with appropriate threads carried by the cap. The cap is also provided with an opening 17 through which the stem of the plunger extends.

In the accompanying drawing I have not illustrated the manner in which this device may be connected with the other parts of the regulator. It will be apparent to those skilled in the art, however, that this device may be applied in various ways to valves and switches to be used for controlling the supply of fuel or electricity to the heating elements. For example, the device, which I have illustrated and described can be readily embodied in a structure of the character illustrated in Newell Patent No. 2,037,142. It can also be readily embodied in devices of the character illustrated in Newell et al. Patent No. 1,998,818 and in devices of the character illustrated in the co-pending application of Victor J. Weber, Serial No. 247,390. Reference is hereby made to said patents and application for a more complete description of operating connections which may be employed for transmitting the motion from the device which I provide to the valve or switch for controlling the fuel or electric current supply.

The fluid to be used in devices of this character should be substantially noncompressible and should expand relatively uniformly when subjected to operating temperatures. Chlorinated diphenyl and mercury are examples of fluids which may be used satisfactorily.

Various different resilient or flexible materials may be utilized. I have found that satisfactory results may be obtained by using neoprene or koroseal or other similar synthetic rubber compounds. I have found that suitable results can also be obtained by using various flexible synthetic resins such as polymerized vinyl acetal, which is a resin sold under the names of "vinylite" and "butvar." It is necessary that the material be flexible, that it retain its flexibility over a long period of time, that it be either self-bonding to the metal casing and plunger or be capable of being substantially permanently bonded to the casing or plunger, and that it retain its flexible characteristics and not break down under the temperatures to which it is to be subjected in normal use. The materials which I have mentioned above possess these characteristics.

Neoprene, which is one of the materials mentioned above, is a synthetic rubber which is relatively immune to deterioration, has great chemical stability at both low and high temperatures, will adhere firmly to brass and brass plated metals by vulcanization in direct contact with the brass, and will substantially permanently retain its mounting and will not be damaged by millions of cycles of loading and unloading. Koroseal is another synthetic rubber compound which possesses the necessary characteristics. This material is more flex-resistant than rubber, has substantial tensile strength, is capable of being elongated anywhere from 2% to 500% by a variation of the plasticizer content, and is resistant to practically all materials except some organic compounds. It is unaffected by oils and water and is highly resistant to ordinary corrosive chemicals. Polymerized vinyl acetal, which is one of the flexible or resilient materials mentioned above, has a relatively high tensile strength, is capable of substantial elongation, and has a high heat distortion point. It has relatively poor resistance to acids, but in ordinary installations devices of the character to which the present invention relates are not positioned where they will be subjected to acids or corrosive chemicals.

While ordinary rubber can be used under certain circumstances as the flexible material in the device which I provide, it will not be satisfactory in most installations in view of the fact that it will not retain relatively uniform characteristics under varying temperature conditions such as those which are frequently encountered in the use of devices of this character. If the device is to be used where the flexible material will not be subjected to elevated or widely varying temperatures, rubber can be used and satisfactory results obtained.

While I have stated above that the flexible material itself need not have sufficient bonding characteristics to obtain a satisfactory bond between it and the metal casing and the plunger, it is preferable that the material have such characteristics. Various adhesives may be employed where the proper bonding characteristics are not possessed by the flexible material but I have found it difficult to find bonding materials which will maintain a satisfactory bond over a long period of time and during a great number of cycles of operation.

While I have indicated above that the casing and plunger are preferably made of metal, it will be understood that these parts may be made from other materials which are capable of withstanding the temperatures to be encountered in the normal use of the device in any particular installation.

While I have indicated above that it is desirable to choose a flexible material which will withstand the temperatures prevailing adjacent the casing, it is not always necessary to do this as appropriate shielding means may be provided around the casing in order to cut down the temperatures to which the flexible material in the casing may be subjected.

In the operation of the device shown in the drawing, the bulb, the tube, and the passageway in the casing will be filled with the expansible liquid. Only sufficient liquid will normally be employed to fill these parts at room temperature. When the temperature surrounding the bulb increases the liquid will expand and move the plunger from the position illustrated in Figure 2 to the position illustrated in Figure 1. When the liquid expands, some of it is forced into the interior of the casing between the face 12 and the head of the plunger. When the temperature surrounding the bulb again drops, the liquid will contract and the parts will resume the position shown in Figure 2. It will be evident to those skilled in the art that when the liquid expands under the influence of heat a substantial force will be exerted on the plunger so as to move it and the operating parts connected thereto. Although it is unnecessary in view of the fact that the resilience of the material 15 will return the plunger to the position shown in Figure 2 upon the contraction of the liquid, in some instances it may be desirable to provide a compression spring or some similar device for assisting the movement of the plunger in the return direction upon the contraction of the liquid.

Figure 4:
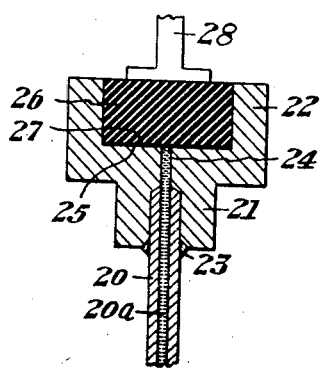
Figure 4 is a partial section through a modified form.

In Figure 4 I have shown a modified form of my invention in which the plunger of the type shown in Figures 1 and 2 is not utilized. In this embodiment of the invention, the tube 20 extends into an opening in the stud 21 which extends downwardly from the main body of the casing 22. The tube is securely held in position in the stud 21 by a weld 23. The passageway 20a of the tube 20 is in direct communication with a passageway 24 which extends through the casing and opens into the interior thereof through the face 25. The interior of the casing is filled with a body of elastic material 26. This body of elastic material is molded into intimate engagement with the interior side walls of the casing or bonded thereto by a suitable adhesive. A thin foil disc 27 is positioned between the face 25 of the casing and the body of flexible material. This disc is not secured to the inner face 25 of the casing and need not be bonded to the flexible material, although if desired it may be securely bonded thereto.

In this embodiment of the invention, I have not shown a cap extending over any portion of the top of the body of flexible material but if desired, a cap somewhat similar to the cap 16 of the embodiment shown in Figures 1 to 3 inclusive may be utilized, although such a cap will normally extend only a very short distance beyond the edge of the body of flexible material. A cap is not necessary, but it may be used in order to assist in maintaining the bond between the side wall of the casing and the body of elastic material over a long period of time.

In the operation of this embodiment of the invention, as the liquid in the bulb expands the liquid will be forced through the tube and into the interior of the casing between the bottom face 25 thereof and the foil disc. This will deflect the body of elastic material and this movement may be transmitted by appropriate means, such as an operating plunger pin or stem 28, to the valve or switch for regulating the supply of fuel or other heating medium. Where this device is not utilized to control temperatures but is used for regulating pressures, any increase in pressure transmitted through the connecting tube 20 will flex the body of resilient material and this movement may be utilized for controlling a valve or some other device for regulating the pressure to be controlled.

As stated above, two of the important advantages of the structure which I proved are that the bulb can be made considerably smaller than bulbs which are presently employed in the diaphragm and bellows type instruments and the quantity of fluid required is likewise appreciably less than is required in the prior art devices. Another important feature of the device which I provide is that the unit for transmitting the fluid pressure to a plunger pin or stem can be made considerably smaller than the bellows or diaphragm of the prior art devices. For example, I have found that satisfactory results can be obtained with the type of device shown in Figure 4 of the drawing where the body of elastic material is only 1/8" thick and 3/8" in diameter. I have also found that entirely satisfactory results can be obtained with a device of the character shown in Figures 1 to 3, inclusive, of the drawing where the diameter of the plunger is only about 1/4". A plunger of this size in a device of this character will give results equivalent to those obtained with a bellows having an effective diameter of 1/2".

While I have shown and described a preferred embodiment and one modified form of my invention, and have set forth various materials which may be used in connection therewith, I do not intend that my invention shall be specifically limited thereto nor do I intend it shall be limited to temperature regulation as it may be utilized for pressure regulation as well. My invention may be embodied otherwise than specifically set forth herein in any manner within the scope of the appended claims.

I claim:

1. In a thermostatic regulator of the type embodying a bulb, a small diameter capillary tube communicating therewith and a thermo-responsive fluid substantially completely filling the bulb and tube, the combination of a casing having a closed end with a passageway therethrough opening into the interior of the casing at one end thereof, the other end of said passageway communicating with said tube, a plunger positioned within the casing and having one end adjacent the end of said passageway, and a body of flexible material within said casing surrounding the passageway and the plunger and adhering tightly to the plunger and the side wall of the casing so that fluid entering the casing can escape therefrom only through said passageway, said body of flexible material being arranged to be flexed and the plunger moved relative to the casing upon the entrance of fluid into the interior of the casing through said passageway and being arranged so that as it moves to unflexed position due to the contraction of the liquid in the bulb the plunger is moved in the reverse direction and substantially all of the fluid entering the casing is forced out of the casing through said passageway.

2. In a thermostatic regulator of the type embodying a bulb, a small diameter capillary tube communicating therewith and a thermo-responsive fluid substantially completely filling the bulb and tube, the combination of a casing having a closed end with a passageway therethrough opening into the interior of the casing at one end thereof, the other end of said passageway communicating with said tube, a plunger positioned within the casing and having one end thereof normally in engagement with said end of the casing and extending over said passageway, and a body of flexible material within said casing surrounding said passageway and the plunger and adhering tightly to the plunger and the side wall of the casing, said body of flexible material being arranged to be flexed and the plunger moved upon the entrance of fluid into the interior of said casing through said passageway and being arranged so that as it moves to unflexed position due to contraction of the liquid in the bulb substantially all of the fluid entering the casing is forced out of the casing through said passageway and the plunger returned to normal position against the end of the casing.

3. In a thermostatic regulator of the type embodying a bulb, a small diameter capillary tube communicating therewith and a thermo-responsive fluid substantially completely filling the bulb and tube, the combination of a casing having a closed end with a passageway therethrough opening into the interior of the casing at one end thereof, a boss within said casing surrounding the passageway, a plunger positioned within said casing and having a head adapted normally to seat on said boss, and a body of flexible material within said casing secured to one wall of the casing and also to the sides of the head of the plunger, whereby movement of the plunger caused by fluid entering said casing through the passageway will flex said body of material in one direction, said body of material being also arranged so that as it returns to unflexed position due to the contraction of the liquid in the bulb substantially all of the fluid entering the casing will be forced outwardly through said passageway.

SAMUEL G. ESKIN.